United States Patent
Herre et al.

(10) Patent No.: US 6,766,293 B1
(45) Date of Patent: Jul. 20, 2004

(54) METHOD FOR SIGNALLING A NOISE SUBSTITUTION DURING AUDIO SIGNAL CODING

(75) Inventors: Jürgen Herre, Buckenhof (DE); Uwe Gbur, Berlin (DE); Andreas Ehret, Nürnberg (DE); Martin Dietz, Nürnberg (DE); Bodo Teichmann, Nürnberg (DE); Oliver Kunz, Sesslach (DE); Karlheinz Brandenburg, Erlangen (DE); Heinz Gerhäuser, Waischenfeld (DE)

(73) Assignee: Fraunhofer-Gesellschaft Zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/367,775

(22) PCT Filed: Mar. 13, 1998

(86) PCT No.: PCT/EP98/01480
§ 371 (c)(1),
(2), (4) Date: Aug. 18, 1999

(87) PCT Pub. No.: WO99/04505
PCT Pub. Date: Jan. 28, 1999

(30) Foreign Application Priority Data

Jul. 14, 1997 (DE) .......................... 197 30 129

(51) Int. Cl.$^7$ ................ G10L 21/02; G10L 21/00
(52) U.S. Cl. ................. 704/226; 704/500; 704/227
(58) Field of Search ................. 704/200.1, 500, 704/501, 503, 504, 201, 226, 227, 228

(56) References Cited

U.S. PATENT DOCUMENTS 5,703,999 A * 12/1997 Herre et al. ............. 704/203
5,825,979 A * 10/1998 Tsutsui et al. ........... 704/500
RE36,714 E * 5/2000 Brandenburg et al. ...... 704/227

FOREIGN PATENT DOCUMENTS

| DE | G 90 06 717.7 | 11/1991 |
| DE | 195 -5 435 C1 | 12/1995 |
| DE | 195 38 852 A1 | 1/1997 |
| EP | 0 714 173 A1 | 5/1996 |

OTHER PUBLICATIONS

Schulz, Improving Audio Codes y Noise Substitution:, Engineering Reports, J. Audio Eng Soc, vol. 44(No. 7/8), p. 595–598, (Jul./Aug. 1996).*

(List continued on next page.)

Primary Examiner—Tālivaldis Ivars Šmits
Assistant Examiner—Angela Armstrong
(74) Attorney, Agent, or Firm—Glenn Patent Group; Michael A. Glenn

(57) ABSTRACT

In a method for signalling a noise substitution when coding an audio signal, the time-domain audio signal is first transformed into the frequency domain to obtain spectral values. The spectral values are subsequently grouped together to form groups of spectral values. On the basis of a detection establishing whether a group of spectral values is a noisy group or not, a codebook is allocated to a non-noisy or tonal group by means of a codebook number for redundancy coding of the same. If a group is noisy, an additional codebook number which does not refer to a codebook is allocated to it in order to signal that this group is noisy and therefore does not have to be redundancy coded. By signalling noise substitution by means of a Huffman codebook number for noisy groups of spectral values, which are e.g. sections made up of scale factor bands which do not have to be redundancy coded, an opportunity is provided to indicate the presence of a noise substitution in a scale factor band in the bit stream syntax of the MPEG-2 Advanced Audio Coding (AAC) Standard without having to interfere with the basic coding structure and without having to meddle with the structure of the existing bit stream syntax.

13 Claims, 4 Drawing Sheets

OTHER PUBLICATIONS

Schulz, Improving Audio Codes y Noise Substitution:, Engineering Reports, J. Audio Eng Soc, vol. 44(No. 7/8), p. 595–598, (Jul./Aug. 1996).*

Johnston et al, "Sum–Difference Stereo Transform Coding", IEEE ICASSP, 1992, pp. 569–571.*

Donald Schulz, "Improving Audio Codecs by Noise Substitution," Engineering Reports, J. Audio Eng. Soc., vol. 44 (No. 7/8), p. 593–598 (Jul./Aug. 1996).

Bosi et al., "ISO/IEC MPEG–2 Advanced Audio Coding," Papers, J. Audio Eng. Soc., vol. 45 (No. 10), p. 789–814 (Oct. 1997).

Southcott et al., "Voice Control of the Pan–European Digital Mobile Radio System," IEEE Global Telecommunications Conference & Exhibition, IEEE Communications Society and Dallas IEEE Section (Dallas, Texas), p. 1070–1074 (Nov. 27–30, 1989).

* cited by examiner

METHOD FOR SIGNALLING A NOISE SUBSTITUTION DURING AUDIO SIGNAL CODING

FIELD OF THE INVENTION

The present invention relates to audio coding methods and in particular to audio coding methods according to the Standard ISO/MPEG, such as e.g. MPEG-1, MPEG-2, MPEG-2 AAC, for the data-reduced representation of high quality audio signals.

BACKGROUND OF THE INVENTION AND DESCRIPTION OF PRIOR ART

The standardization body ISO/IEC JTC1/SC29/WG11, which is also known as the Moving Pictures Expert Group (MPEG), was founded in 1988 in order to specify digital video and audio coding schemes for low data rates. In November 1992 the first specification phase was completed with the Standard MPEG-1. The audio coding system according to MPEG-1, which is specified in ISO 11172-3, works in a one-channel or two-channel stereo mode at sampling frequencies of 32 kHz, 44.1 kHz and 48 kHz. The Standard MPEG-1 Layer II delivers radio quality, as it is specified by the International Telecommunication Union, at a data rate of 128 kb/s per channel.

In its second development phase the aims of MPEG were to define a multichannel extension for MPEG-1 audio which should be backwards compatible with the existing MPEG-1 systems, and also to define an audio coding standard at lower sampling frequencies (16 kHz, 22.5 kHz, 24 kHz) than in MPEG-1. The backwards compatible standard (MPEG-2 BC) and the standard with lower sampling frequencies (MPEG-2 LSF) were completed in November 1994. MPEG-2 BC delivers a good audio quality at data rates of 640–896 kb/s for 5 channels with full bandwidth. Since 1994 the MPEG-2 Audio Standardization Committee has been striving to define a multichannel standard with higher quality than is attainable if backwards compatibility with MPEG-1 is required. This non-backwards-compatible audio standard according to MPEG-2 is denoted by MPEG-2 NBC. The aim of this development is to achieve radio quality according to the ITU-R requirements at data rates of 384 kb/s or less for 5-channel audio signals for which each channel has the full bandwidth. The Audio Coding Standard MPEG-2 NBC was completed in April 1997. The scheme MPEG-2 NBC will become the nucleus of the already planned Audio Standard MPEG-4, which will have higher data rates (over 40 kb/s per channel). The NBC or non-backwards compatible standard combines the coding efficiency of a high-resolution filter bank, of prediction techniques and of the redundancy reducing Huffman coding to achieve an audio coding with radio quality at very low data rates. The Standard MPEG-2 NBC is also denoted by MPEG-2 NBC AAC (AAC=Advanced Audio Coding). A detailed description of the technical content of MPEG-2 AAC is to be found in M. Bosi, K. Brandenburg, S. Quackenbush, L. Fiedler, K. Akagiri, H. Fuchs, M. Dietz, J. Herre, G. Davidson, Yoshiaki Oikawa: "ISO/IEC MPEG-2 Advanced Audio Coding", 101st AES Convention, Los Angeles 1996, Preprint 4382.

Efficient audio coding methods remove both redundancies and irrelevancies from audio signals. Correlations between audio sampling values and statistics of the sampling value representation are exploited so as to remove redundancies. Frequency domain and time domain masking properties of the human auditory system are exploited so as to remove imperceptible signal content (irrelevancies). The frequency content of the audio signal is subdivided into subbands by means of a filter bank. The data rate reduction is achieved by quantizing the spectrum of the time-domain signal according to psychoacoustic models and may include a lossless coding method.

Generally speaking, a time-continuous audio signal is sampled so as to obtain a time-discrete audio signal. The time-discrete audio signal is windowed by means of a window function so as to obtain successive blocks or frames with a certain number, e.g. 1024, of windowed time-discrete sampled values. Each block of windowed time-discrete sampled audio signal values is transformed in turn into the frequency domain, which may be achieved using a modified discrete cosine transform (MDCT) for example. Since the spectral values obtained in this way are not yet quantized, it is necessary to quantize them. Here the main aim is to quantize the spectral data in such a way that the quantization noise is masked or concealed by the quantized signals themselves. This is achieved with the aid of a psychoacoustic model described in the MPEG AAC Standard which, taking account of the special properties of the human ear, calculates masking thresholds depending on the audio signal involved. The spectral values are now quantized in such a way that the quantized noise which is introduced is concealed and therefore inaudible. The quantization does not therefore result in any audible noise.

In the NBC Standard a so-called non-uniform quantizer is used. Additionally, a method for shaping the quantization noise is used. The NBC method, like previous standards, employs the individual amplification of groups of spectral coefficients, which are known as scale factor bands. To work as efficiently as possible it is desirable to be able to shape the quantization noise into units which are based as closely as possible on the frequency groups of the human auditory system. In this way it is possible to group together spectral values which very closely reflect the bandwidth of the frequency groups. Individual scale factor bands can be amplified by means of scale factors in stages of 1.5 dB. The noise shaping is achieved since amplified coefficients have larger amplitudes. They will therefore in general have a higher signal/noise ratio after quantization. On the other hand, larger amplitudes require more bits for the coding, i.e. the bit distribution between the scale factor bands is implicitly changed. The amplification through the scale factors must of course be corrected in the decoder. For this reason the amplification information, which is stored in the scale factors in units of 1.5 dB steps, must be transmitted to the decoder as side information.

After quantization of the spectral values, possibly amplified through scale factors, in the scale factor bands, the spectral values themselves should be coded. The input signal into a noiseless coding module is thus the set of e.g. 1024 quantized spectral coefficients. The sets of 1024 quantized spectral coefficients are partitioned by the noiseless coding module into "sections" in such a way that a single Huffman codebook is used to code each section. For reasons of coding efficiency, section boundaries can only exist at scale factor band boundaries such that for each section of the spectrum both the length of the section in scale factor bands and the Huffman codebook number used for the section must be transmitted as side information.

The forming of the sections is dynamic and varies typically from block to block in such a way that the number of bits needed to represent the full set of quantized spectral coefficients is minimized. The Huffman coding is used to represent n-tuples of quantized coefficients, the Huffman code being derived from one of 12 codebooks. The maximum absolute value of the quantized coefficients which can be represented by each Huffman codebook and the number of coefficients in each n-tuple for each codebook are specified a priori.

The point of forming the sections thus consists in grouping together regions with the same signal statistics so as to obtain, with a single Huffman codebook for a section, the highest possible coding gain, the coding gain generally being defined as the quotient of the bits before coding and the bits after coding. By means of a codebook number, which is specified in the bit stream syntax used for the NBC method, one of the 12 Huffman codebooks is referred to, namely the one which makes possible the highest coding gain for a specific section. The expression "codebook number" in this application is thus meant to designate the place in the bit stream syntax which is reserved for the codebook number. To code 11 different codebook numbers in binary, 4 bits are required. For each section, i.e. for each group of spectral values, these 4 bits must be transmitted as side information to enable the decoder to select the correct appropriate codebook for decoding.

Another technique which has aroused interest of late is that of "noise substitution", the aspects of which are described in detail in Donald Schulz: "Improving Audio Codecs by Noise Substitution", Journal of the Audio Eng. Soc., Vol. 44, No. 7/8, pp. 593–598, July/August 1996. As already mentioned, traditional audio coding algorithms normally use masking effects of the human ear to reduce decisively the data rate or the number of bits to be transmitted. Masking thus means that one or more frequency components as spectral values render inaudible other components with lower levels. This effect can be exploited in two ways. Firstly, audio signal components which are masked by other components do not have to be coded. Secondly, the introduction of noise through the quantization just described is permissible if this noise is concealed by components of the original signal.

With noisy signals the human auditory system is not capable of detecting the exact variation of such a signal with time. As a consequence, in common algorithms even the waveform of the white noise, which is practically irrelevant for the human ear, was coded. Unless special measures are taken, coding noisy signals taking account of the human ear thus entails high bit rates for information which is inaudible. If, however, noisy components of signals are detected and coded with information on their noise level, their frequency range or duration, such superfluous coding can be reduced, which can result in very considerable bit economies. This fact is underpinned by the science of psychoacoustics, which teaches that the perception of noise signals depends primarily on their spectral composition and not on the actual waveform. This therefore makes it possible to use the noise substitution technique in the data reduction of audio signals.

The coder is thus faced with the task of finding or recognizing noise-like or noisy spectral values in the whole spectrum of the audio signal. One definition of noisy spectral values is as follows: If a signal component can be characterized by its level, its frequency range and its duration in such a way that it can be reconstructed by a noise substitution method without audible differences for the human auditory system, this signal component is classified as noise. The detection of this characteristic can be performed either in the frequency domain or in the time domain, as is described in the publication last cited. The simplest method consists e.g. in detecting tonal, i.e. non-noisy, components by using a time-frequency transform and by following stationary peaks in successive time-domain spectra. These peaks are described as tonal, everything else as noisy. This represents a relatively coarse noise detection, however. Another possibility of distinguishing between noisy and tonal spectral components is to use a predictor for spectral values in successive blocks. Here a prediction is performed from one spectrum to the following spectrum, i.e. the spectrum which is assigned to the next time-domain block or frame. If a predicted spectral value does not differ, or differs only slightly, from a spectral value of the next time-domain block or frame which is actually ascertained by transform, it is assumed that this spectral value represents a tonal spectral component. From this a tonality measure p can be derived, whose value forms the basis of a decision for distinguishing between tonal and noisy spectral values. This detection method is only suitable for strictly stationary signals, however. It fails to detect situations involving sine signals which change their frequencies slightly as a function of time. Such signals often appear in audio signals, e.g. as vibratos, and it is obvious to a person skilled in the art that these cannot be replaced by a noisy component.

A further possibility for detecting noisy signals is noise detection by prediction in the time domain. An adapted filter is suitable for use here as the predictor, which can be used time after time to perform a linear prediction, as is sufficiently well known in the technical field. Past audio signals are fed in and the output signal is compared with the actual audio sampling value. If the prediction error is small, tonality can be assumed. To determine the character of different frequency regions, i.e. to detect whether a group of spectral values in the spectral region is a noisy group, time-frequency transforms of the original and of the predicted signal must be carried out. A tonality measure can then be calculated for each frequency group by comparing the original and the predicted values with each other. A major problem thereby is the limited dynamic range of the predictor. A noisy frequency group with a high level dominates the predictor because of the large error which results. Other frequency regions with tonal components could be interpreted as noisy. This problem can be mitigated by using an iterative algorithm wherein the error signal normally has a lower level than the original signal and is fed in again by another predictor, after which the two predicted signals are added together. Further methods are explained in Schulz's publication.

The group of spectral values now classified as noisy is not quantized and transmitted to the receiver in entropy-coded or redundant-coded form (by means of a Huffman codebook e.g.) as is normally the case. Instead, only an identification indicating the noise substitution and a measure of the energy of the noisy group of spectral values are transmitted as side information. In the receiver random values (noise) with the transmitted energy are then inserted for the substituted coefficients. The noisy spectral values are thus replaced by random spectral values with the corresponding energy measure.

Through the transmission of a single item of energy information instead of a group of codes, i.e. a plurality of quantized and coded spectral values, for the quantized spectral coefficients, considerable data economies are possible. It is obvious that the attainable data rate economies depend on the signal. Should the signal have very low noise content, i.e. very few noisy groups, or have transient properties, the possible data rate economy will be smaller than when a very noisy signal with very many noisy groups is coded.

The Standard MPEG-2 Advanced Audio Coding (AAC) described at the outset does not support the possibility of noise substitution. The considerable data rate economies are thus not possible with the current standard.

SUMMARY OF THE INVENTION

It is the object of the present invention to extend the scope of the existing Standard MPEG-2 AAC to include the possibilities of noise substitution in such a way that neither the fundamental coding structure nor the structure of the existing bit stream syntax are affected.

In accordance with a first aspect of the present invention, this object is achieved by a method for signalling a noise substitution when coding an audio signal, comprising the steps of: transforming a time-domain audio signal into the frequency domain to obtain spectral values; grouping the spectral values together to form groups of spectral values; detecting whether a group of spectral values is a noisy group; if a group is not noisy, allocating a codebook from a plurality of codebooks for the redundancy coding of the non-noisy group, the codebook allocated to the group being referred to by means of a codebook number; and if a group is noisy, allocating an additional codebook number, which does not refer to a codebook, to this group to signal that this group is noisy and is therefore not redundancy coded.

In accordance with a second aspect of the present invention, this object is achieved by a method for coding an audio signal, comprising the steps of: signalling a noise substitution according to the method of the above outlined first aspect of the present invention; calculating a measure of the energy of a noisy group; entering the measure of the energy in the side information assigned to the group; entering the additional codebook number in the side information assigned to the group; quantizing the non-noisy groups and coding the quantized non-noisy groups using the codebook referred to by the codebook number, whereas no quantization or coding takes place for noisy groups; and forming a bit stream which comprises quantized and coded non-noisy groups and, for noisy groups, a measure of the energy of the spectral values of the noisy groups and the additional codebook number for signalling the noisy groups.

In accordance with a third aspect of the present invention, this object is achieved by a method for decoding a coded audio signal, comprising the steps of: receiving a bit stream; redundancy decoding non-noisy groups on the basis of a codebook indicated by a codebook number and requantizing redundancy-decoded, quantized spectral values; identifying a noisy group of spectral values on the basis of an additional codebook number which is assigned to such a group; establishing a measure of the energy of the spectral values in the noisy group on the basis of the side information assigned to the group; generating noise spectral values for the noisy group, the measure of the energy of the noise spectral values in the noisy group being the same as the measure of the energy of the spectral values of the noisy group in the original signal; and transforming the requantized spectral values and the noise spectral values into the time domain to obtain a decoded audio signal.

The present invention is based on the finding that in the case where a noise substitution is performed for a noisy band no quantization and redundancy coding or Huffman coding of spectral values need be performed. Instead, as has already been described, noise spectral values for a noisy group are generated in the decoder, the measure of the energy of said spectral values corresponding to the measure of the energy of the noise-substituted spectral values. In other words, no codebooks are used for noisy groups since no redundancy coding takes place. Consequently the codebook number, i.e. the corresponding place in the bit stream syntax of the coded audio signal, is also superfluous. This place in the bit stream syntax, i.e. the codebook number, can now according to the present invention be used to indicate that a group is noisy and subject to a noise substitution. As has also been mentioned, only 12 codebooks are envisaged; however the place in the bit stream syntax provides for 4 bits, with which a number range of 0–15 can be represented in total in binary, so that so-called additional codebook numbers exist which do not point to any codebook. Only the codebook numbers 0–11 point to a codebook. In a preferred embodiment of the present invention the codebook number 13 is used to signal to the decoder that the group which has the codebook number 13, i.e. the additional codebook number, in its side information is a noisy group and has been subjected to a noise substitution. For persons skilled in the art it is, however, obvious that the additional or free codebook number 12, 14 or 15 can be employed.

BRIEF DESCRIPTION OF THE DRAWINGS

Preferred embodiments of the present invention are described in the drawings, in which.

DETAILED DESCRIPTION OF PREFERRED EMBODIMENTS

Figure 1:
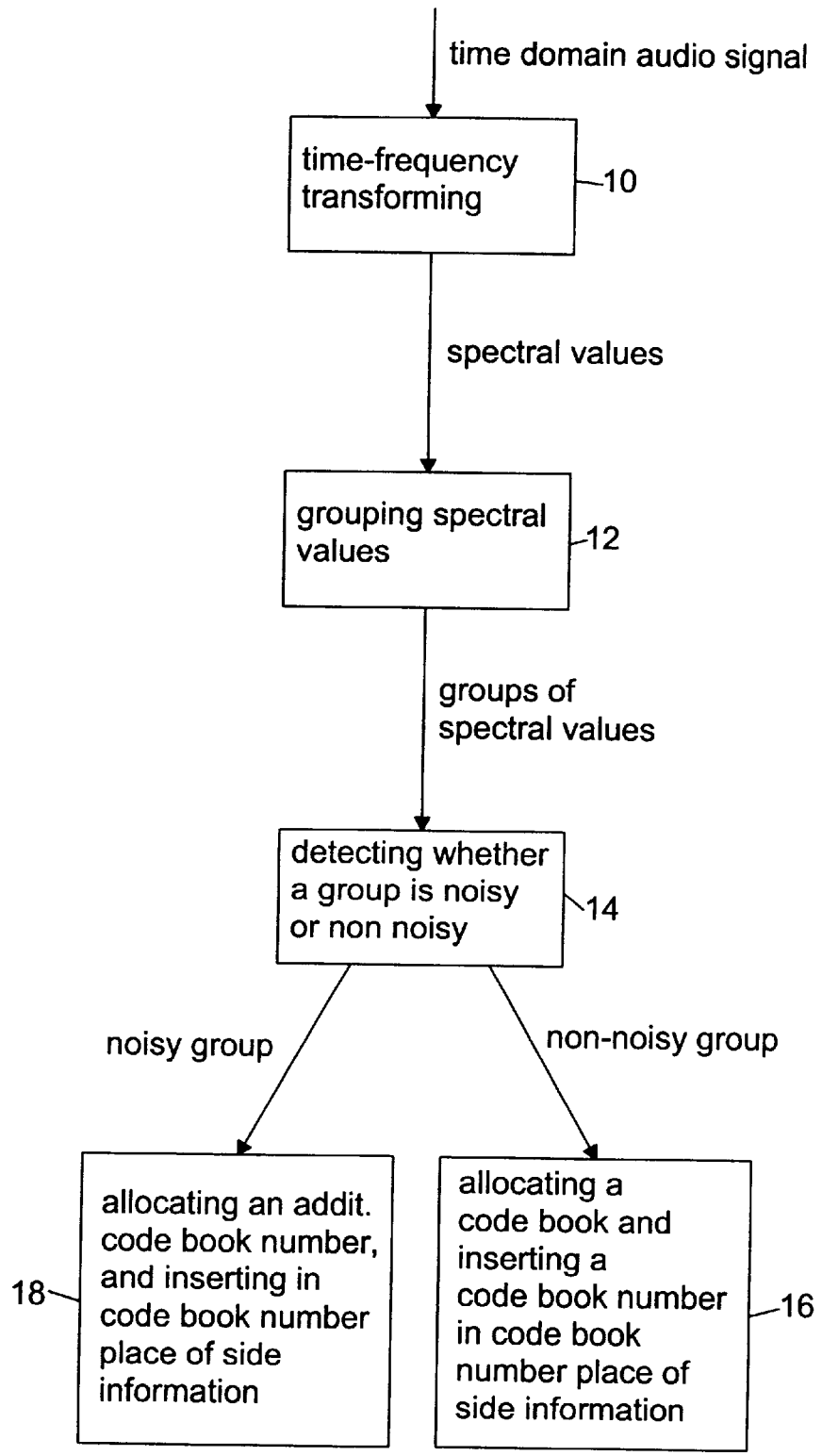
FIG. 1 shows a schematic diagram of an inventive method for signalling a noise substitution.

As has already been described, the spectral values which are present after a frequency domain transform of the time-domain audio signal can be grouped into scale factor bands so as to achieve optimal masking of the quantization noise. In the Standard MPEG-2 AAC several scale factor bands are also grouped into sections. For the most part a section thus consists of several scale factor bands. This means that a noise substitution is always signalled for a complete section, i.e. whether the noise substitution is active or not active. Because of the fact that the noisy scale factor bands are not quantized, no scale factors for these have to be calculated or transmitted or coded. This means that in addition to the codebook number, which indicates the noise substitution per se, another place is free in the bit stream and can be used for other purposes. In the preferred embodiment of the present invention a measure of the energy of the replaced spectral coefficients is written into the place provided for the scale factor in the side information for a scale factor band. As has already been mentioned, the perception of noise signals depends primarily on their spectral composition and not on their actual waveform. From the spectral values of a noisy scale factor band a measure of the energy of the spectral values of the noisy scale factor band is thus calculated. This quantity is entered in the side information in place of the scale factor band without any additional side information being necessary and without having to change the structure of the bitstream syntax. This quantity for transmission can be either the total energy of the spectral values in a noisy scale factor band or the mean energy, which e.g. is normalized on a spectral value or a spectral line in the scale factor band. In the preferred embodiment of the present invention, however, the total energy and not the mean energy is used as the measure of the energy.

For the transmission of the measure of the energy of the replaced spectral values, the same resolution as that used for the inverse scaling of the transmitted spectral data is preferably used, i.e. a logarithmic scaling with a resolution of 1.5 dB in the AAC Standard. Similarly to the situation for the Layer-III method, in the AAC method reconstruction of the non-noisy, i.e. tonal, spectral content is achieved by a) applying the inverse characteristic of the non-linear quantizer to the quantized value (X) of the spectral line ($Y=X^{4/3}$) and then b) performing an "inverse scaling" according to the transmitted scale factors ($z=Y \times 2^{(SF/4)}$), where SF is the scale factor of the respective scale factor band and Z represents the requantized spectral value. The resolution thus amounts to 1.5 dB.

In the method for signalling a noise substitution when coding an audio signal according to the present invention, wherein no scale factor is needed for a noisy scale factor band, the measure of the energy of the substituted spectral values being employed instead, the same coding laws are employed for the measure of the energy of the substituted spectral values as would otherwise be used for the scale factor. This constitutes an advantageous use of already available resources in the AAC coder and does not require any additional side information.

A further advantageous application of the signalling of the noise substitution occurs for stereo audio signals. The human ear is able to perceive to a certain extent a correlation between the signals or channels (L and R) of a pair of stereo channels, called a "channel pair" in AAC. For this reason the correlation between the two replaced or substituted noise signals of the channel pair should be similar to that of the original signal in the case of a noise substitution as well. Scale factor bands in the left and in the right channel which have the same middle frequency can both be noise substituted if noisiness is detected. If both channels are noise-substituted, and no further measures are taken, the noise spectral values randomly generated in the coder will of course have the same total energy as in the original audio signal but they are completely uncorrelated due to the random generation. This can lead to audible errors in certain circumstances. To avoid this it is possible to use the same randomly generated noise spectral values of a scale factor band for both channels, which corresponds to a complete correlation of the noisy scale factor bands of the left and the right channel.

According to a preferred embodiment of the present invention the following procedure is adopted in this case: for each channel pair there exists in the AAC Standard a so-called middle/side mask (M/S mask), which in the standard itself is denoted by "ms_used". This M/S mask is a bit vector which indicates band by band whether an M/S stereo coding has been employed, which is known to persons skilled in the art and which is described in an introductory manner in J. D. Johnston, A. J. Ferreira: "Sum-Difference Stereo Transform Coding" IEEE ICASSP 1992, pp. 569–571 and also in the MPEG-AAC Standard. The M/S mask consists of a number of bits, each of which is assigned to a scale factor band. If an M/S coding is employed in a scale factor band, a signalling bit which communicates the M/S coding to the decoder will be set in the M/S mask in the side information. If a noisy scale factor band is detected in the left and the right channel for the same middle frequency of the scale factor bands (for L and for R), however, then obviously no middle/side coding takes place. Thus the M/S bit for this scale factor band, like the codebook number and the scale factor, is available in the bit stream according to the bit stream syntax to signal something else. In this case the bit in the M/S mask can be used for the noisy scale factor band of both channels so as to indicate whether independent noise spectral values or noise vectors should be generated for the left and the right channel, which would correspond to the normal case, or whether the same noise vector for both the left and the right channel should be used in the noisy scale factor band.

As is known to persons skilled in the art, in the case of non-noisy scale factor bands the scale factors can be coded by means of a difference coding. For a corresponding scale factor in a subsequent scale factor band it is not necessary to code the total value of the scale factor again but simply the difference between this value and the preceding one. This is called difference coding. In a preferred embodiment of the present invention this difference coding is likewise employed to code the measure of the energy of the spectral content in a noisy scale factor band. As a result the total measure of the energy does not have to be coded again for a subsequent scale factor band but only the difference between the current measure and the preceding one, which again provides the opportunity of bit economies. It is obvious that an initial starting value must always be available; this may, however, also be a fixed value predetermined at the outset. This method of difference coding will therefore be particularly advantageous when successive scale factor bands in frames are noisy.

FIG. 1 shows the inventive method of signalling a noise substitution, when coding an audio signal. A time-domain audio signal is converted into a frequency domain to obtain spectral values using a time-frequency transforming step 10. The spectral values are grouped together by means of a grouping step 12 to form groups of spectral values, each group having assigned side information, the side information having a defined code book number place for receiving a code book number.

In a detecting step 14, it is detected whether a group of spectral values is a noisy group or a non-noisy group. If a group is not noisy, i.e., a non-noisy group, the right branch in FIG. 1 is taken. In particular, a code book from a plurality of code books for a redundancy coding of the non-noisy group is allocated, the code book allocated to the group being referred to by means of a code book number, the code book number being inserted in the defined code book number place of the side information for the non-noisy group (block 16). If a group is noisy, the left branch in FIG. 1 is taken. In this case, an additional code book number, which does not refer to a code book, is allocated to the noisy group to signal that this group is noisy and is, therefore, not redundancy coded, the additional code book number being inserted in the defined code book number place of the side information for the noisy group (block 18).

Figure 2:
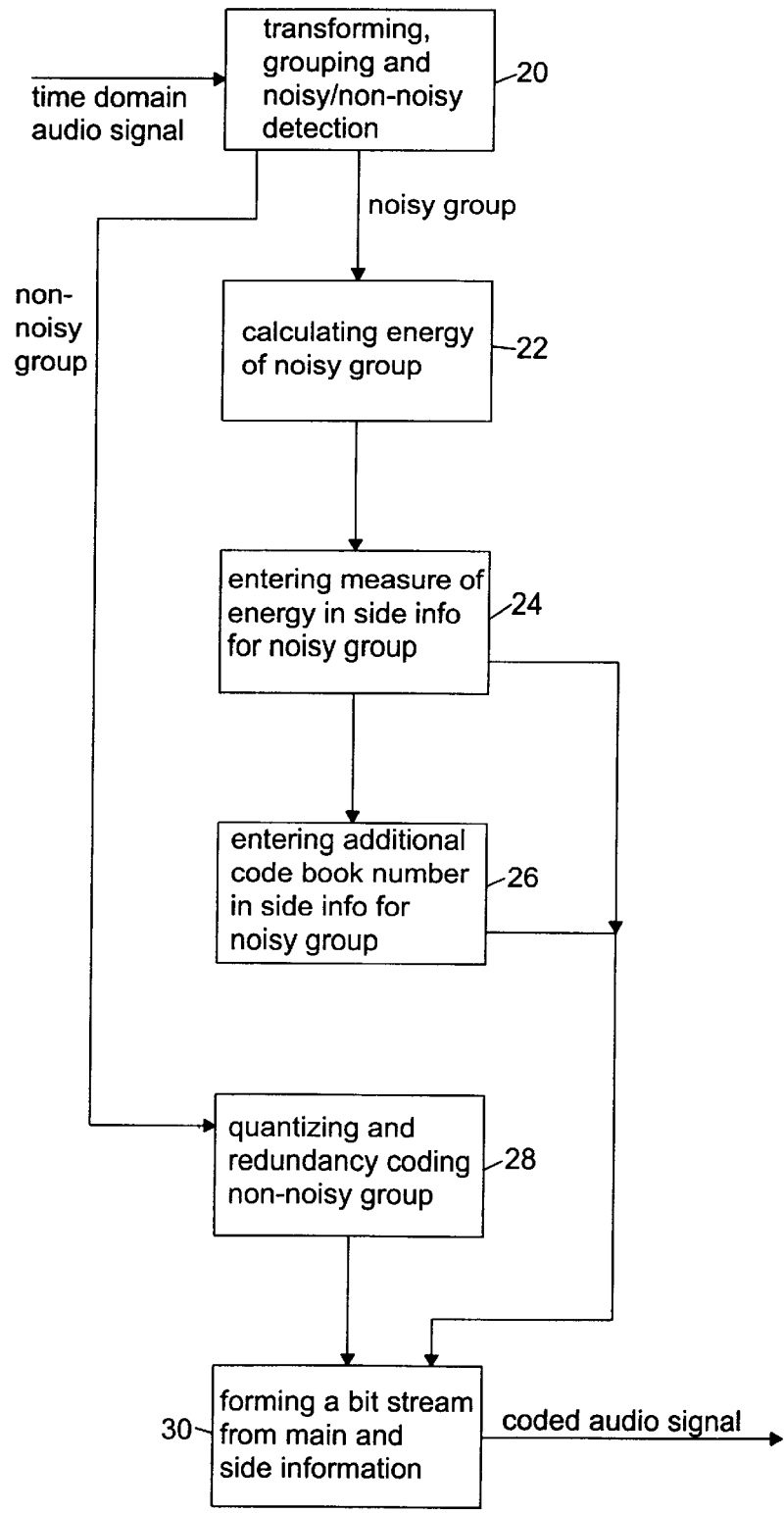
FIG. 2 shows a schematic diagram of the inventive method for coding an audio signal that includes the inventive method for signalling.

FIG. 2 shows a schematic block diagram of the inventive method for coding an audio signal. A time-domain audio signal is transformed, grouped, and a noisy/non-noisy detection is performed (block 20) as has been outlined in connection with FIG. 1. Then the energy of a noisy group is calculated (block 22). The calculated measure of the energy is entered into the side information for the noisy group (block 24). Additionally, the additional code book number allocated to the noisy group in block 18 of FIG. 1 is entered into the side information for the noisy group, and, in particular, at the code book number place of the side information (block 26). In block 28, a non-noisy group is quantized and redundancy coded. In block 30, a bit stream is formed from main and side information, the main information of the bit stream including the quantized and redundancy coded non-noisy groups obtained from block 28, and, as side information for noisy groups, the measure of the energy of the spectral values from block 24 and the additional code book number for signalling the noisy groups from block 26. At the output of block 30, a bit stream is obtained that represents the coded audio signal.

Figure 3:
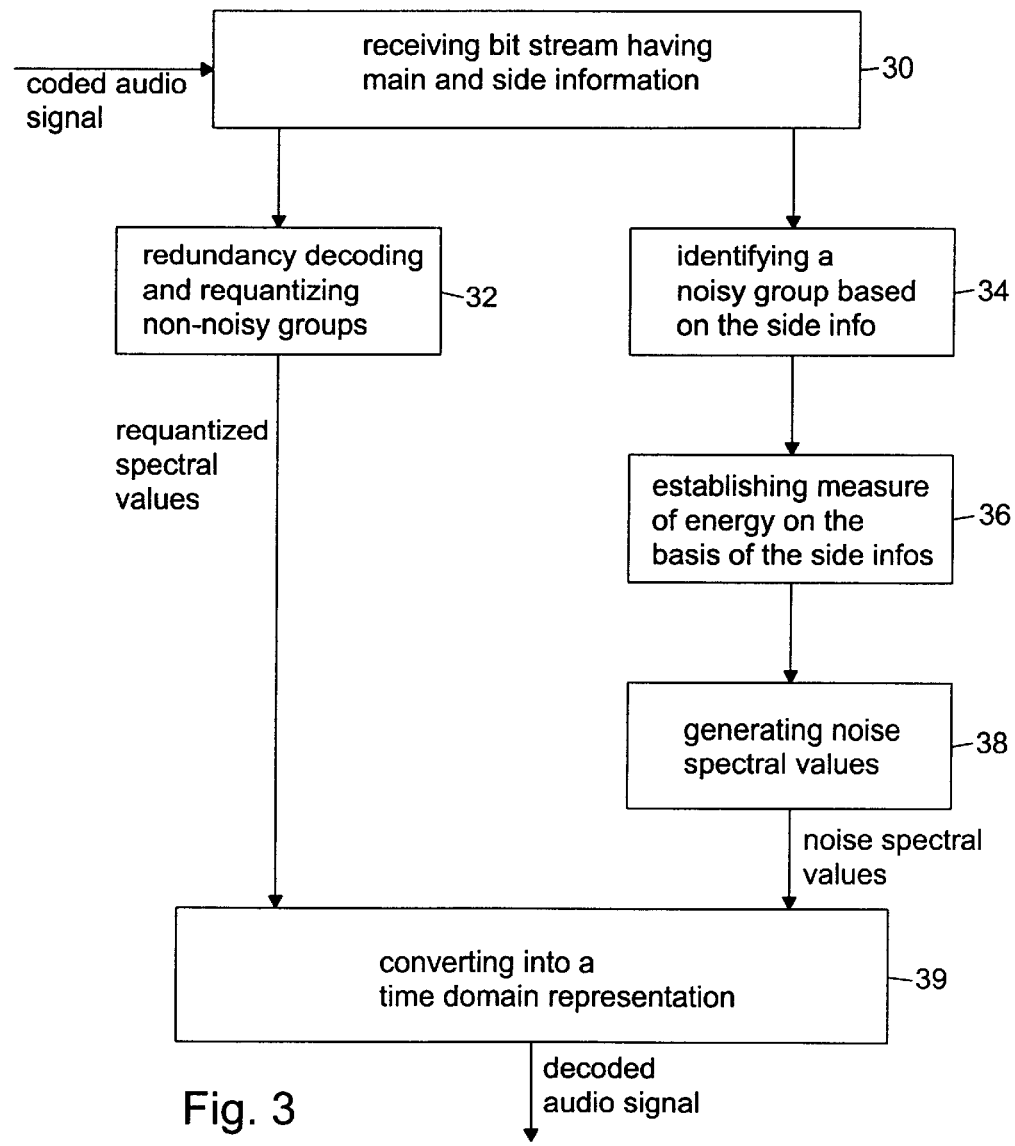
FIG. 3 shows a schematic diagram of the inventive method of decoding a coded audio signal.

FIG. 3 shows an estimated diagram of the inventive method of decoding a coded audio signal. In block 30, the bit stream is received, wherein the bit stream includes the side information. The side information has a defined code book number place. In block 32, non-noisy groups are redundancy decoded and requantized to obtain requantized spectral values. In block 34, it is identified whether there is a noisy group based on the side information at the code book number place (block 34). In block 36, a measure of the energy of the spectral values in the noisy group is established on the basis of the side information assigned to the group. In block 38, noise spectral values are generated on the basis of the measure of energy established in block 36.

In block 39, the requantized spectral values and the noise spectral values are converted into a time-domain representation to obtain a decoded audio signal.

Figure 4:
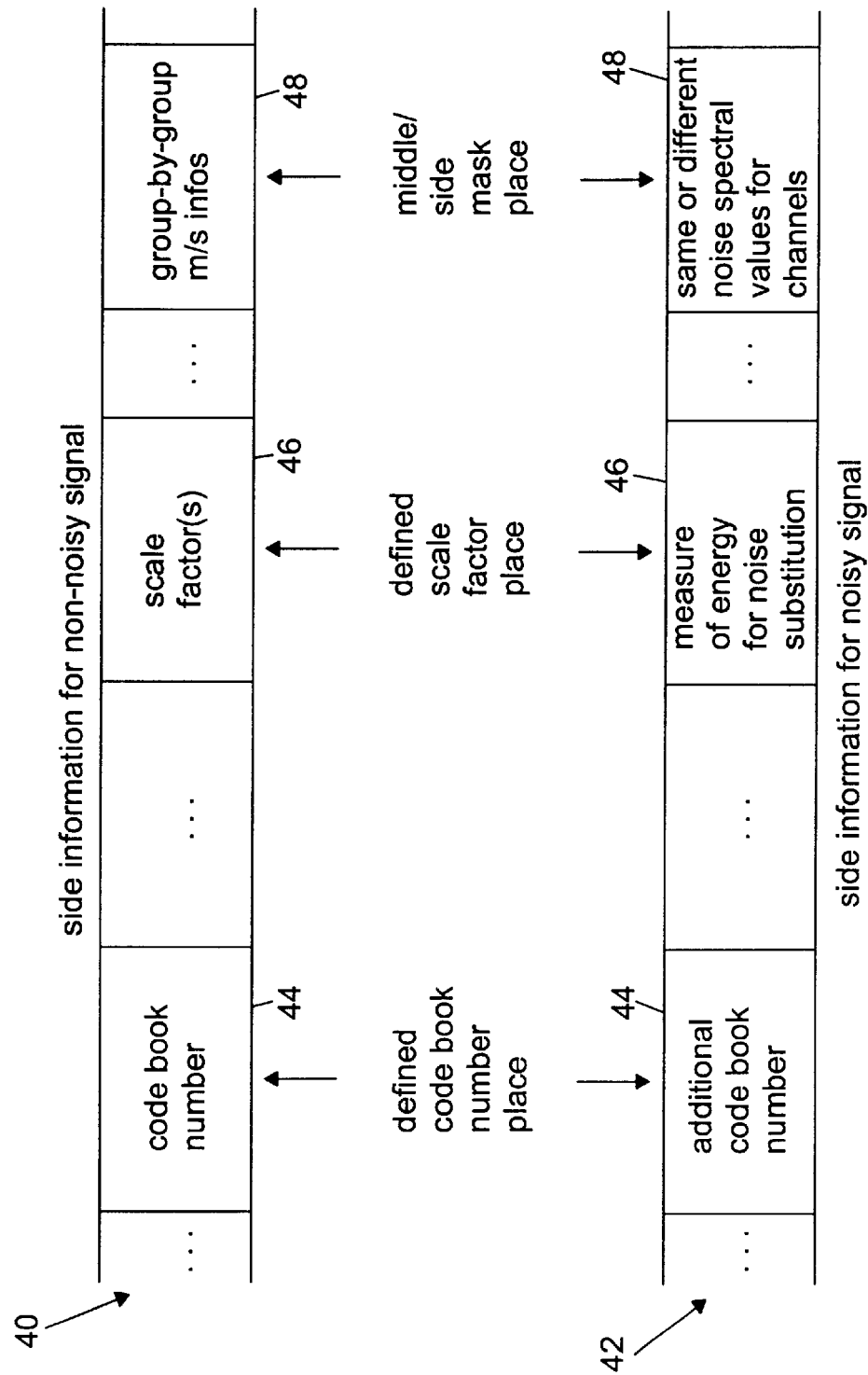
FIG. 4 shows a comparison between the side information for a non-noisy signal and a noisy signal.

FIG. 4 shows a schematic comparison of side information for a non-noisy signal 40 and side information for a noisy signal 42.

As has been outlined above, the bit stream syntax is the same for non-noisy signals and noisy signals. Therefore, there exists a defined code book number place 44, a defined scale factor place 46 and, in addition, a defined middle/side mask place 48 irrespective of the fact, whether the side informations are meant for a non-noisy signal or for a noisy signal.

At the defined code book number place of the non-noisy signal side information, there is, in accordance with the prior art, the code book number. Additionally, at the defined scale factor place in the side information for the non-noisy signal, there is the one or more scale factor(s). Additionally, as is known in the art, at the middle/side mask place, there is the middle/side mask including group-by-group middle/side information.

Regarding the side information for a noisy signal, the situation is different. At the code book number place 44 for the noisy signal, there is not written a code book number referring to a certain code book for redundancy coding, but there is an additional code book number that does not refer to a code book but that signals a decoder that the group to which the considered side information belongs is a noisy group.

At the scale factor place 46 in the side information for a noisy signal, there is not written any scale factor, since such scale factors are not needed for noisy groups. Instead, there is written a measure of energy which can be used by a decoder for performing noise substitution. At the middle/side mask place of the side information for a noisy signal, there is not the middle/side mask, since such information is not necessary for noise-substituted signals. Instead, there is written information indicating whether different or the same noise spectral values are to be used for both channels when decoding a coded audio signal.

What is claimed is:

1. A method for signalling a noise substitution when coding an audio signal, comprising the following steps:
converting a time-domain audio signal into a frequency domain to obtain spectral values;
grouping the spectral values together to form groups of spectral values, each group having assigned side information, the side information having a defined code book number place for receiving a code book number;
detecting whether a group of spectral values is a noisy group;
if a group is not noisy, allocating a code book from a plurality of code books for a redundancy coding of the non-noisy group, the code book allocated to the group being referred to by means of a code book number, the code book number being inserted in the defined code book number place of the side information for the non-noisy group; and
if a group is noisy, allocating an additional code book number, which does not refer to a code book, to this group to signal that this group is noisy and is therefore not redundancy coded, the additional code book number being inserted in the defined code book number place of the side information for the noisy group.

2. The method according to claim 1, wherein the groups of spectral values are sections, one codebook number being allotted for non-noisy sections and an additional codebook number for noisy sections.

3. The method according to claim 2,
wherein the section has assigned side information, the side information for the section having a defined scale factor place for receiving one or more scale factors;
wherein a section comprises one or more scale factor bands, each scale factor band having a scale factor assigned to it; and
wherein in the case of a noisy scale factor band a measure of the energy of the spectral values in the noisy scale factor band is inserted in the defined scale factor place instead of a scale factor.

4. The method according to claim 3, wherein the measure of the energy of the spectral values in a noisy group is the mean energy of the same, normalized on a reference value, in a scale factor band.

5. The method according to claim 3, wherein the measure of the energy is the total energy of the spectral values in the noisy scale factor band.

6. The method according to claim 3, wherein the same scaling is used to code the measure of the energy of the noisy spectral values in the scale factor band as is normally used to code a scale factor of a scale factor band which is not a noisy scale factor band.

7. The method according to claim 3, wherein the coding of the measure of the energy of the spectral values in noisy scale factor bands is a difference coding.

8. The method according to claim 1,
wherein the audio signal is a stereo audio signal;
wherein a middle/side coding of the two channels of the stereo audio signal is indicated group by group by a middle/side mask, the middle/side mask being inserted in side information assigned to a coded audio signal, and
wherein in the case of noisy groups of both channels having corresponding frequencies it is indicated by the middle/side mask in the side information whether different or the same noise spectral values are to be used for both channels when decoding a coded audio signal.

9. The method according to claim 1, wherein detecting whether a group of spectral values is a noisy group is performed by means of the time-domain audio signal or by means of the spectral values of the time-domain audio signal or by means of both the time-domain audio signal and the spectral values of the time-domain audio signal.

10. A method for coding an audio signal, comprising the following steps:
- signalling a noise substitution by means of the following substeps:
- transforming a time-domain audio signal into the frequency domain to obtain spectral values;
- grouping the spectral values together to form groups of spectral values, each group having assigned side information, the side information having a defined code book number place for receiving a code book number;
- detecting whether a group of spectral values is a noisy group;
- if a group is not noisy, allocating a code book from a plurality of code books for a redundancy coding of the non-noisy group, the code book allocated to the group being referred to by means of a code book number, the code book number being inserted in the defined code book number place of the side information for the non-noisy group; and
- if a group is noisy, allocating an additional code book number, which does not refer to a code book, to the noisy group to signal that this group is noisy and is therefore not redundancy coded, the additional code book number to be inserted in the defined code book number place of the side information for the noisy group;
- calculating a measure of the energy of the noisy group;
- entering the measure of the energy in the side information assigned to the noisy group;
- entering the additional code book number in the defined code book number place of the side information assigned to the noisy group;
- quantizing the non-noisy groups and redundancy coding the quantized non-noisy groups using the code book referred to by the code book number, whereas no quantization or coding takes place for noisy groups; and
- forming a bit stream which comprises as main information quantized and redundancy coded non-noisy groups and as side information, for noisy groups, the measure of the energy of the spectral values of the noisy groups and the additional code book number for signalling the noisy groups.

11. A method for decoding a coded audio signal, comprising the following steps:
- receiving a bit stream including side information, the side information having a defined code book number place;
- redundancy decoding non-noisy groups on the basis of a code book indicated by a code book number at the code book number place of the side information for the non-noisy groups and requantizing redundancy-decoded, quantized spectral values;
- identifying a noisy group of spectral values on the basis of an additional code book number at the code book number place of the side information for the non-noisy group-which is assigned to the non-noisy group;
- establishing a measure of the energy of the spectral values in the noisy group on the basis of the side information assigned to the group;
- generating noise spectral values for the noisy group, the measure of the energy of the noise spectral values in the noisy group being the same as the measure of the energy of the spectral values of the noisy group in an audio signal before coding; and
- converting the requantized spectral values and the noise spectral values into a time domain representation to obtain a decoded audio signal.

12. The method according to claim 11, wherein the noise spectral values are obtained by generating random numbers or by receiving the same from a table, the summed energy of the noise spectral values corresponding to the measure of the energy of the spectral values of the noisy group of the original audio signal.

13. The method according to claim 11, which includes the following further steps:
- analyzing a middle/side mask located in the side information for stereo audio signals having two channels;
- using either identical noise spectral values for corresponding noisy groups of the two channels or generating two independent groups of noise spectral values for the two channels, depending on a contents of the middle/side mask for noisy groups of the stereo audio signals.

* * * * *